United States Patent [19]

Woo

[11] 4,344,512

[45] Aug. 17, 1982

[54] DUO SERVO DRUM BRAKE AND PARKING MECHANISM THEREFOR

[75] Inventor: Ji Y. Woo, South Bend, Ind.

[73] Assignee: The Bendix Corporation, Southfield, Mich.

[21] Appl. No.: 122,942

[22] Filed: Feb. 20, 1980

[51] Int. Cl.³ .................. F16D 51/20; F16D 65/56
[52] U.S. Cl. .................. 188/79.5 GE; 188/79.5 P; 188/106 F; 188/106 A; 188/326
[58] Field of Search .......... 188/79.5 P, 79.5 S, 188/79.5 GE, 79.5 GT, 79.5 GC, 106 A, 106 F, 325, 326

[56] References Cited

U.S. PATENT DOCUMENTS

| | | | |
|---|---|---|---|
| 2,295,758 | 9/1942 | Safford | 188/106 A |
| 2,372,319 | 3/1945 | Francois | 188/106 A |
| 2,842,229 | 7/1958 | Ross | 188/106 A |
| 3,232,391 | 2/1966 | Burnett | 188/106 A |
| 3,709,334 | 1/1973 | Kondo et al. | 188/106 A |
| 4,236,614 | 12/1980 | Johannesen | 188/79.5 P |

FOREIGN PATENT DOCUMENTS

| | | | |
|---|---|---|---|
| 1480334 | 7/1969 | Fed. Rep. of Germany | 188/325 |
| 2155097 | 5/1973 | France | |
| 2303197 | 10/1976 | France | 188/79.5 P |
| 990758 | 4/1965 | United Kingdom | |
| 1190115 | 5/1970 | United Kingdom | 188/79.5 P |

Primary Examiner—Edward R. Kazenske
Attorney, Agent, or Firm—Paul David Schoenle; Ken C. Decker

[57] ABSTRACT

A duo servo drum brake includes a pair of brake shoes which are movable by a hydraulic actuator during a service brake application to a braking position in engagement with a rotatable member. A strut and parking lever are engageable with respective brake shoes to separate the same during a parking brake application. In order to control a running clearance between the pair of brake shoes and the rotatable member, an extendible assembly is disposed between the pair of brake shoes opposite the hydraulic actuator. The extendible assembly is also responsive to a parking brake application to expand the pair of brake shoes into engagement with the rotatable member.

3 Claims, 5 Drawing Figures

DUO SERVO DRUM BRAKE AND PARKING MECHANISM THEREFOR

The present invention relates to a duo servo drum brake assembly wherein a pair of brake shoes are movable from a non-braking position to a braking position by a hydraulic actuator. In order to maintain a predetermined running clearance between the pair of brake shoes and a rotatable member, an extendible assembly is disposed between the pair of brake shoes opposite the hydraulic actuator to control the position of the pair of brake shoes relative to the rotatable member. During a parking brake application, a strut extending between the pair of brake shoes cooperates with a lever pivotally coupled to one of the pair of brake shoes to move the pair of brake shoes radially outwardly to the braking position.

In the prior art the strut is disposed adjacent the hydraulic actuator and the lever is also pivotally coupled to the end of the one brake shoe adjacent the hydraulic actuator. Consequently, during a parking brake application the forces transmitted from the pair of brake shoes to the rotatable member are concentrated near the hydraulic actuator. Therefore, a substantial portion of the brake shoe linings remote from the hydraulic actuator are slightly engaging the rotatable member rather than fully engaging the rotatable member as provided for adjacent the hydraulic actuator.

In my copending application, U.S. patent application Ser. No. 80,809, I provide an anchor assembly for a non-servo drum brake which is responsive to a parking brake application to more fully expand a pair of brake shoes during parking. With respect to a duo servo drum brake, I provide for more uniform expansion of the pair of brake shoes during parking than taught by the prior art.

In order to overcome the disadvantages of the prior art, the extendible assembly is provided with a second mode of extension in addition to a first mode of extension. The first mode depends on the running clearance between the pair of brake shoes and the rotatable member. Moreover, the extendible assembly is coupled to a parking brake lever so that when the parking brake lever is actuated, the extendible assembly will undergo extension via the second mode. As a result the pair of brake shoes will be expanded by the strut and lever adjacent the hydraulic actuator and also by the extendible assembly opposite the hydraulic actuator during parking.

A preferred embodiment provides a link pivotally secured to an end of the parking lever. A parking brake cable connects with one end of the link and a rod extends from the other end of the link to connect with a cam. A pair of sleeves on the extendible assembly engage respective brake shoes and define openings for receiving a nut and bolt. The cam cooperates with one of the sleeves and either the nut or bolt to move the sleeves apart in response to actuation of the parking lever and cam. A shoulder or abutment on one of the the sleeves is engageable with the nut to prevent rotation of the nut relative to the one sleeve.

It is an advantageous effect of the present invention that the forces applied to the pair of brake shoes during parking are substantially uniform from the hydraulic actuator end to the extendible assembly end. Each brake shoe moves uniformly to the right or left during parking, rather than merely pivoting about the extendible assembly. With more surface lining area in engagement with the rotatable member, the frictional resistance imparted to the rotatable member is increased.

The invention will now be described by way of example, with reference to the accompanying drawings in which.

Figure 1:
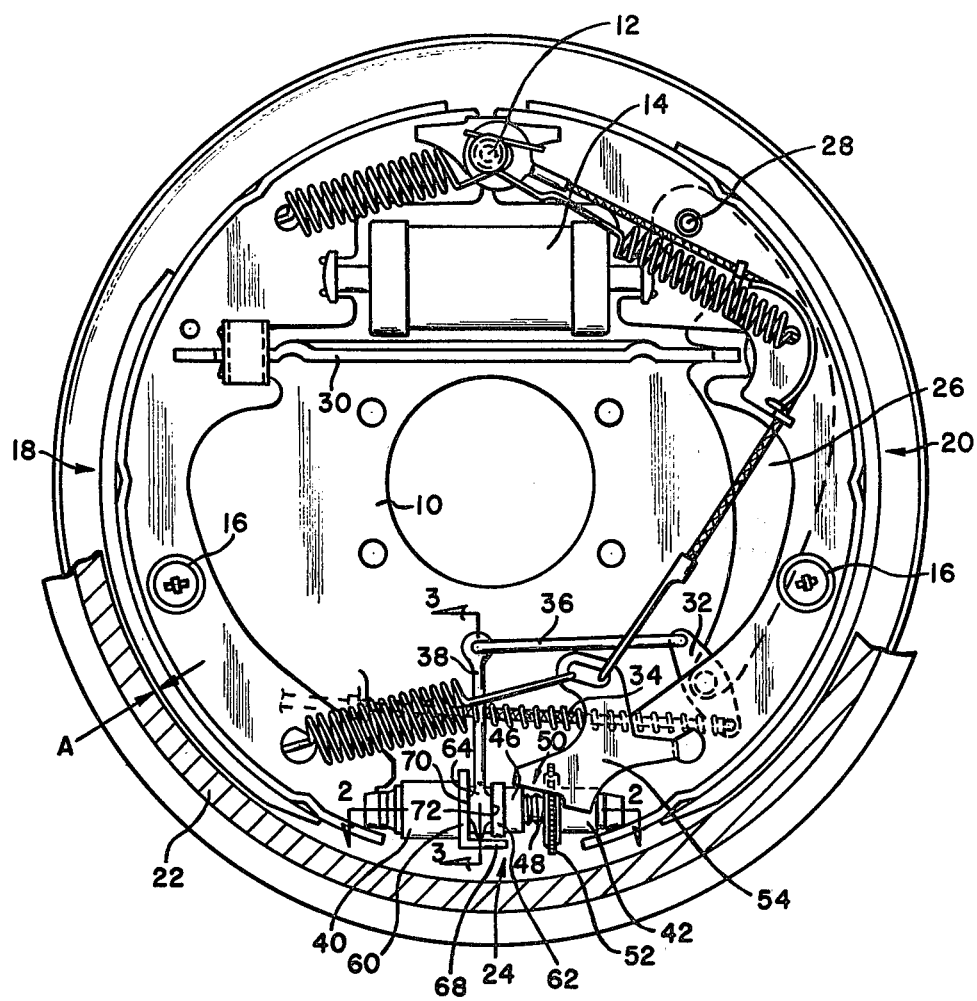
FIG. 1 is a front view of a duo servo drum brake constructed in accordance with the present invention.

In FIG. 1, a backing plate 10 is adapted to connect with an axle flange (not shown) on a vehicle. The backing plate fixedly secures an anchor pin 12 and a hydraulic 14 actuator. Hold-down springs 16 extend from the backing plate 10 to a pair of brake shoes 18 and 20 to movably support the brake shoes relative to the backing plate. A rotatable member shown in part at 22 circumscribes the brake shoes 18 and 20 to define a predetermined running clearance A. An extendible assembly 24, to be described in detail later, is disposed between the brake shoes opposite the hydraulic actuator. During a service brake application, the hydraulic actuator biases the ends of the brake shoes adjacent the hydraulic actuator to expand. Frictional forces between the brake shoes and rotatable member cause the brake shoes to rotate slightly with the rotatable member so that the brake shoe 20, if the direction of rotation is counterclockwise in FIG. 1, is biased into engagement with rotatable member by the slight rotation of the brake shoe 18 acting through the extendible assembly 24.

Figure 2:
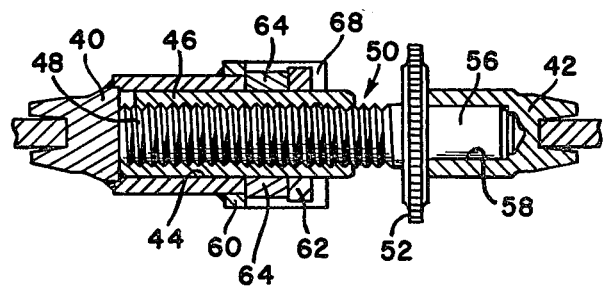
FIG. 2 is a cross-sectional view taken along line 2—2 of FIG. 1.
Figure 3:
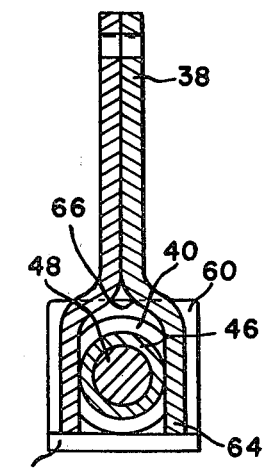
FIG. 3 is a cross-sectional view taken along line 3—3 of FIG. 1.

A parking lever 26 is pivotally anchored via pin 28 to the brake shoe 20 adjacent the hydraulic actuator 14 and a strut 30 extends from the parking lever 26 to the brake shoe 18. In accordance with the invention, the parking lever 26 leads to a link 32 pivotally coupled to the end of the parking lever opposite pin 28. A parking brake cable 34 connects with one end of the link 32, while a connecting rod 36 extends from the other end of the link to engage a cam 38 which is carried by the extendible assembly 24. The extendible assembly includes a first sleeve 40 engaging brake shoe 18 and a second sleeve 42 engaging brake shoe 20. The first sleeve 40 defines an opening 44, see FIG. 2, receiving a cylindrical nut 46 and a threaded portion 48 of a bolt or stem 50. The stem 50 defines a ratchet wheel 52 engageable with an adjusting pawl 54 and includes a portion 56 extending into an opening 58 on the second sleeve 42. The first sleeve 40 and cylindrical nut 46 define abutment flanges 60 and 62, respectively. The cam 38 is disposed between the flanges 60 and 62 to oppose the same and is split at one end 64 to define a cavity 66 receiving the cylindrical nut 46, see FIG. 3. Preferably, the flange 62 is rectangular so that a tab 68 extending from the first sleeve flange 60 is engageable with the rectangular flange 62 to prevent the cylindrical nut 46 and flange 62 from rotating relative to the sleeve 40. Moreover, the split end 64 of the cam 38 is engageable with the tab 68 to position a pair of cam surfaces 70 and 72 on the end 64 at a predetermined location substantially at the middle of flanges 60 and 62, respectively.

During a parking brake application, the cable 34 is pulled to the left in FIG. 1 so that the link 32 rotates clockwise about the end of lever 26 and the lever 26 pivots clockwise about pin 28. With the lever 26 pivoting clockwise, the strut 30 will be moved to the left to move the end of brake shoe 18 adjacent the hydaulic actuator to the left. Also, the lever 26 is fulcrumed about the right end of strut 30 so that the pin 28 will be moved to the right to move the end of brake shoe 20 to the right. At the same time that the lever 26 is pivoting clockwise, the connecting rod 36 is moving to the right in response to the clockwise rotation of the link 32. As a result the cam 38 pivots about its surfaces 70 and 72 to move the sleeve 40 to the left and the cylindrical nut 46 to the right. Therefore, the cam 38 causes the sleeves 40 and 42 and corresponding ends of brake shoes 18 and 20 opposite the hydraulic actuator to move to the left and right, respectively, at the same time the strut and lever are causing the ends adjacent the hydraulic actuator to move in similar directions.

Figure 4:
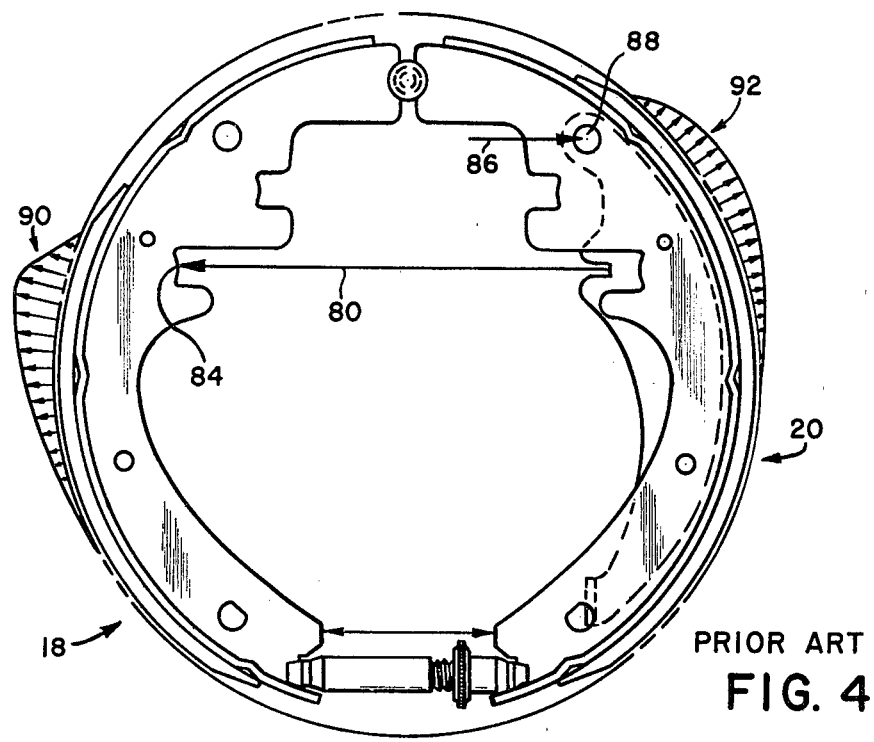
FIG. 4 is a schematic view of the static force distribution during parking for a prior art duo-servo drum brake.

Turning to FIG. 4, the forces developed during parking for a prior art non-servo drum brake are shown. With the strut force 80 acting against the left brake abutment 84 and the parking lever force 86 acting against the right brake pin 88, the force distribution for each brake shoe lining is shown at 90 and 92. It is seen that only the portion of each brake shoe lining adjacent the hydraulic actuator or substantially horizontally in line with the strut is engageable with the rotatable member to impart a force resisting rotation of the rotatable member. The portion of each brake shoe lining adjacent the extendible assembly 24 is spaced from the force 80. Any contact between the rotatable member and the portion of brake shoe lining adjacent the extendible assembly will impart minimum resistance to the rotatable member.

Figure 5:
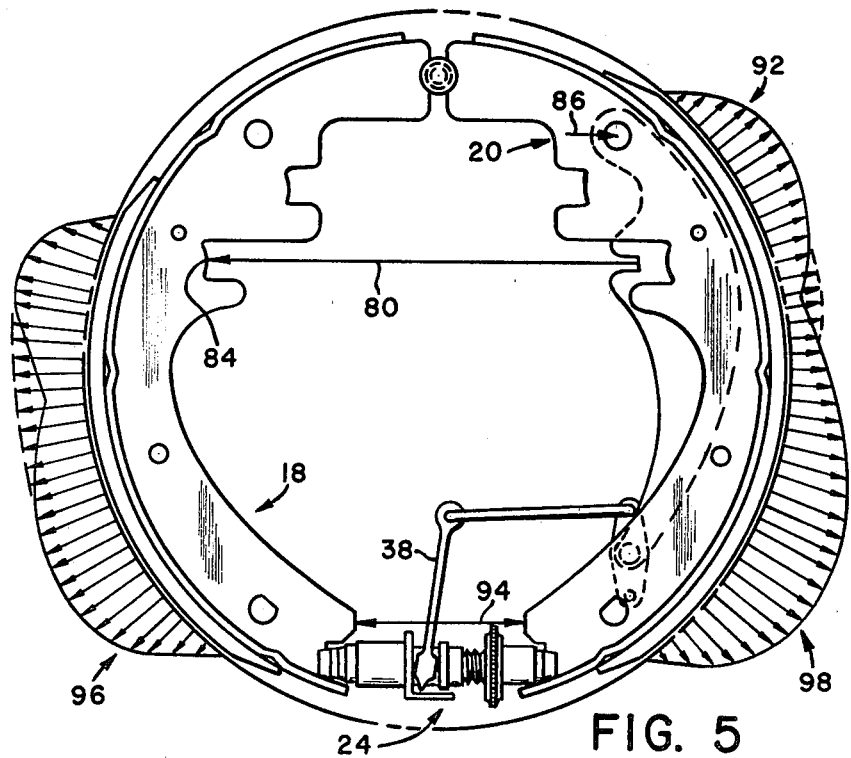
FIG. 5 is a schematic view of the static force distribution during parking for the present invention.

In FIG. 5, the forces developed during parking for the present invention are shown. In addition to the forces of the strut and parking lever which are illustrated at 90 and 92, the cam 38 cooperates with the extendible assembly 24 to generate a separating force 94 for the ends of the brake shoes opposite the hydraulic actuator. As a result, the brake shoe linings adjacent the extendible assembly are fully engaged with the rotatable member to impart forces 96 and 98 for each brake shoe against the rotatable member to resist rotation of the latter. Consequently, when comparing FIGS. 4 and 5, the force distribution for the present invention is more uniform over the brake shoes 18 and 20 and their associated friction linings during parking than the prior art.

Although the cam 38 in FIG. 1 is shown between flanges 60 and 62 on the sleeve 40 and cylindrical nut 46, it is possible to locate the cam 38 between the stem 50 and sleeve 42 to generate separation forces during parking. Moreover, the connecting rod 36 could be eliminated if the cam is directly coupled to the end of the link 32. Other modifications by one skilled in the art are also feasible provided the cam is responsive to actuation of the parking lever.

I claim:

1. A duo servo drum brake and parking mechanism therefor comprising a pair of brake shoes (18, 20) cooperating with a hydraulic actuator (14) during service braking to retard rotation of a drum (22), a parking lever (26) pivotally coupled to one of the pair of brake shoes and cooperating with a strut (30) to move that portion of the pair of brake shoes (18, 20) adjacent the hydraulic actuator (14) into frictional engagement with the drum (72) during a parking brake application, an extendible assembly (24) engaging the pair of brake shoes (18, 20) opposite the hydraulic actuator (14), the extendible assembly (24) being extendible in a first mode in response to an excessive clearance between the pair of brake shoes (18, 20) and the drum (22) during the service braking application in order to substantially maintain a predetermined clearance between the pair of brake shoes (18, 20) and the drum (22), and connecting means (32, 36, 38) extending between the parking lever (26) and the extendible assembly (24), characterized by said connecting means including a cam (38) engageable with said extendible assembly, a link (32) pivotally carried by said parking lever (26) and a rod (36) connecting said cam (38) with said link (32), said extendible assembly (24) defining a pair of flanges (60, 62) forming a spacing therebetween for receiving said cam (38), said link (32) pivoting relative to said parking lever (26) during the parking brake application to bias said parking lever (26) to pivot relative to one of said pair of brake shoes and also to move said cam (38) relative to said extendible assembly via said rod (36), movement of said cam (18) relative to said extendible assembly (24) biasing said pair of flanges (60, 62) to separate from each other to define a second mode of extension for said extendible assembly (24) and move that portion of said pair of brake shoes (18, 20) adjacent said extendible assembly (24) into frictional engagement with the drum (22) simultaneously with the cooperation of the parking lever (26) and the strut (30), said extendible assembly comprising a first sleeve engageable with one of the pair of brake shoes, a second sleeve engageable with the other brake shoe, a threaded member rotatable relative to said sleeves and a cylindrical member telescoping into one of said sleeves and threadably engaging said threaded member, said cylindrical member and said one sleeve defining said pair of flanges which are normally spaced from each other.

2. The drum brake assembly of claim 1 in which said one sleeve includes an abutment to prevent rotation between said cylindrical member and said one sleeve.

3. The drum brake assembly of claim 2 in which said abutment also cooperates with said cam to position the latter relative to the extendible assembly.

* * * * *